(12) United States Patent
Park et al.

(10) Patent No.: US 12,491,626 B2
(45) Date of Patent: Dec. 9, 2025

(54) SOFT ACTUATOR HAVING COOLER, WEARABLE ROBOT HAVING THE SAME, MASSAGE DEVICE HAVING THE SAME, AND METHOD FOR CONTROLLING THE SAME

(71) Applicant: KOREA INSTITUTE OF MACHINERY & MATERIALS, Daejeon (KR)

(72) Inventors: Cheol-Hoon Park, Daejeon (KR); Seyoung Kim, Anyang-si (KR); Sung-Hyuk Song, Daejeon (KR); Hyunuk Seo, Seoul (KR); Young-Su Son, Daejeon (KR); Sang-Yong Ham, Daejeon (KR); Byungin Kim, Daejeon (KR); Hyunmok Jung, Sejong (KR); Seongjun Park, Sejong (KR); Kyungjun Choi, Daejeon (KR)

(73) Assignee: KOREA INSTITUTE OF MACHINERY & MATERIALS, Daejeon (KR)

(*) Notice: Subject to any disclaimer, the term of this patent is extended or adjusted under 35 U.S.C. 154(b) by 1063 days.

(21) Appl. No.: 17/603,832

(22) PCT Filed: Mar. 25, 2020

(86) PCT No.: PCT/KR2020/004037
§ 371 (c)(1),
(2) Date: Oct. 14, 2021

(87) PCT Pub. No.: WO2020/262802
PCT Pub. Date: Dec. 30, 2020

(65) Prior Publication Data
US 2022/0213875 A1 Jul. 7, 2022

(30) Foreign Application Priority Data

Jun. 24, 2019 (KR) .................. 10-2019-0075063
Dec. 13, 2019 (KR) .................. 10-2019-0166505

(51) Int. Cl.
*B25J 9/10* (2006.01)
*B25J 9/00* (2006.01)
(Continued)

(52) U.S. Cl.
CPC ........... *B25J 9/1085* (2013.01); *B25J 9/0006* (2013.01); *B25J 9/1075* (2013.01); *B25J 9/16* (2013.01); *F03G 7/0614* (2021.08); *F03G 7/066* (2021.08)

(58) Field of Classification Search
CPC .......... B25J 9/0006; B25J 9/0054; F03G 7/06
See application file for complete search history.

(56) References Cited

U.S. PATENT DOCUMENTS 6,405,532 B1 * 6/2002 Shahinpoor ............ B25J 9/1095
60/512
2017/0203432 A1 * 7/2017 Andrianesis ............ A61F 5/013

FOREIGN PATENT DOCUMENTS

JP 09-109320 A 4/1997
JP 2005304960 A * 11/2005
(Continued)

OTHER PUBLICATIONS

Machine Translation of JP2005304960 (Year: 2005).*
(Continued)

*Primary Examiner* — Brandy S Lee
*Assistant Examiner* — Mishal Zahra Hussain
(74) *Attorney, Agent, or Firm* — Hauptman Ham, LLP

(57) ABSTRACT

In a soft actuator having a cooler, a wearable robot having the soft actuator, a massage device having the soft actuator,
(Continued)

and a method for controlling the soft actuator, the soft actuator includes a heat reaction member, a cooling part and a controller. The heat reaction member is configured to be contracted or relaxed according to a temperature change. The cooling part includes a cooling surface disposed at the heat reaction member, and a heating surface disposed opposite to the cooling surface. The controller is configured to control a power supply part so that a power is blocked to be supplied to the heat reaction member and the power is supplied to the cooling part, when the heat reaction member is changed to be a relaxation state.

11 Claims, 14 Drawing Sheets

(51) Int. Cl.
  *B25J 9/16*  (2006.01)
  *F03G 7/06*  (2006.01)

(56) References Cited

FOREIGN PATENT DOCUMENTS

| | | | |
|---|---|---|---|
| JP | 2019094789 A | * | 6/2019 |
| KR | 10-2016-0013663 | * | 2/2016 |
| KR | 10-2016-0013663 A | | 2/2016 |
| KR | 10-1784298 B1 | | 10/2017 |
| KR | 10-2017-0130647 A | | 11/2017 |
| KR | 10-1868265 B1 | | 6/2018 |
| KR | 10-1967215 B1 | | 4/2019 |

OTHER PUBLICATIONS

International Search Report issued on Jul. 2, 2020, for corresponding International Patent Application No. PCT/KR2020/004037.
Written Opinion issued on Jul. 2, 2020, for corresponding International Patent Application No. PCT/KR2020/004037.

* cited by examiner

SOFT ACTUATOR HAVING COOLER, WEARABLE ROBOT HAVING THE SAME, MASSAGE DEVICE HAVING THE SAME, AND METHOD FOR CONTROLLING THE SAME

CROSS-REFERENCE TO RELATED APPLICATION

The present application is a national stage filing under 35 U.S.C § 371 of PCT application number PCT/KR2020/004037 filed on Mar. 25, 2020 which is based upon and claims the benefit of priorities to Korean Patent Application No. 10-2019-0075063 filed on Jun. 24, 2019, and Korean Patent Application No. 10-2019-0166505 filed on Dec. 13, 2019, in the Korean Intellectual Property Office, which are incorporated herein in their entireties by reference.

BACKGROUND

1. Field of Disclosure

The present disclosure of invention relates to a soft actuator having a cooler, a wearable robot having the soft actuator, a massage device having the soft actuator, and a method for controlling the soft actuator, and more specifically the present disclosure of inventions relates to a soft actuator having a cooler for enhancing relaxation response, a wearable robot having the soft actuator, a massage device having the soft actuator, and a method for controlling the soft actuator.

2. Description of Related Technology

Generally, industrial workers, unloading workers, package delivers and so on, pick up heavy weight objects repeatedly and moves the objects repeatedly.

Those kinds of working need a lot of workers or additional equipment such as a heavy equipment, a crane, a pulley and so on. In addition, when the workers work the working directly, worker's fatigue is increased and working efficiency is decreased, and furthermore, industrial accidents such as a musculoskeletal system injury may be caused due to the high working intensity. Thus, avoidance may be caused on those kinds of workings, and relatively larger area of moving space or equipment space is necessary when the additional equipment is used, so that the use of the additional equipment may be restricted.

Thus, wearable strength aids are necessary for releasing a standing up action with picking up the heavy weight object repeatedly, or releasing an enduring action with having the heavy weight object.

Recently, the wearable strength aids are normally attached to a side of an arm or a leg, and are operated using a motor and a frame.

However, those kinds of wearable strength aids need the motor for driving the frame, and the weight is increased and the structure is not flexible, so that those aids cause difficulty in natural movement and also cause uncomfortable to wear.

Thus, a wearable robot (strength-enhancing clothing) having a light weight, not impeding body movement with being attached to a similar position of human muscle, and increasing responsiveness of various kinds of operations, should be developed.

To meet the above needs, a fabric flexible actuator and a strength assisting device having the fabric flexible actuator, in which a shape memory alloy spring is used, was developed. However, the shape memory alloy spring depends on a natural cooling in controlling a temperature, and thus the cooling speed is relatively slow. Thus, the wearable robot (strength assisting device) normally has a relatively slow relaxation rate.

SUMMARY

The present invention is developed to solve the above-mentioned problems of the related arts.

The present invention provides a soft actuator, capable of not impeding body movement with being attached to a similar positon of human muscle, increasing responsiveness of various kinds of operations, and increasing cooling speed of a shape memory alloy spring with using the shape memory alloy spring.

In addition, the present invention also provides a wearable robot having the soft actuator.

In addition, the present invention also provides a massage device having the soft actuator.

In addition, the present invention also provides a method for controlling soft actuator.

According to an example embodiment, soft actuator includes a heat reaction member, a cooling part and a controller. The heat reaction member is configured to be contracted or relaxed according to a temperature change. The cooling part includes a cooling surface disposed at the heat reaction member, and a heating surface disposed opposite to the cooling surface. The controller is configured to control a power supply part so that a power is blocked to be supplied to the heat reaction member and the power is supplied to the cooling part, when the heat reaction member is changed to be a relaxation state.

In an example, the cooling surface and the heating surface may be respectively cooled and heated, when the power is supplied to the cooling part.

In an example, the cooling part may be a flexible thermoelectric element, and a body of the soft actuator may have a material which is contracted or relaxed according as the heat reaction member is contracted or relaxed.

In an example, the soft actuator may further include a body configured to receive at least a portion of the heat reaction member inside of the body. The body and the cooling part may be connected with each other.

In an example, the cooling part may be connected to the body so that the cooling part is disposed inside of or outside of the heat reaction member along a longitudinal direction of the heat reaction member.

In an example, the cooling part may include first and second cooling parts facing each other with disposing the heat reaction member between the first and the second cooling parts.

According to another example embodiment, a soft actuator includes a heat reaction member, a cooling part and a controller. The heat reaction member is configured to be contracted or relaxed according to a temperature change. The cooling part is configured to cool down the heat reaction member forcibly. The controller is configured to control a power supply part so that a power is blocked to be supplied to the heat reaction member and the power is supplied to the cooling part, when the heat reaction member is changed to be a relaxation state. The cooling part sprays a cooling air to make direct contact with the heat reaction member, for increasing a relaxation speed of the heat reaction member, when the heat reaction member is in a relaxation state.

In an example, the soft actuator may further include a body configured to receive at least a portion of the heat reaction member inside of the body.

In an example, the cooling part may include an inlet flow configured to flow the cooling air inside of the body, and a discharge flow configured to flow the cooling air outside of the body.

In an example, the heat reaction member may be arranged along a direction inside of the body, and an inlet portion of the inlet flow for the cooling air may be formed as an opening heading for the direction.

In an example, the inlet flow for the cooling air may be formed at a first side of the body, and the discharge flow for the cooling air may be formed at a second side of the body.

In an example, the heat reaction member may be arranged along a direction inside of the body, and the inlet flow for the cooling air may have a micro inlet flow which is extended from the inlet flow along the direction.

In an example, the micro inlet flow may have a length shorter than that of the heat reaction member in the relaxation state.

In an example, each of the micro inlet flow and the heat reaction member may be a plural, and each of the plurality of micro inlet flows may be disposed between the plurality of heat reaction members to prevent the heat reaction members adjacent to each other from making contact with each other.

In an example, an inlet portion may be formed as a plural at the micro inlet flow, and at least one inlet portion may have an opening substantially perpendicular to the direction along which the heat reaction member is arranged.

According to still another example embodiment, a wearable robot includes a cloth body and the soft actuator configured to be connected to the cloth body. A first side of the soft actuator is disposed at a first body fixing part, and a second side of the soft actuator is disposed at a second body fixing part which is disposed opposite to the first body fixing part with respect to a position corresponding to a joint.

In an example, the wearable robot may further include a sensing part configured to measure a movement of a wearer. Here, the controller may control a power supply part so that a power is blocked to be supplied to the heat reaction member and the power is supplied to the cooling part, when the sensing part measures a relaxation action of the wearer.

According to still another example embodiment, a massage device includes an elastic band and the soft actuator configured to be connected to the elastic band.

According to still another example embodiment, in a method for controlling a soft actuator, a power supply part is controlled so that a power is blocked to be supplied to a heat reaction member and the power is supplied to a cooling part, when the heat reaction member is changed to be a relaxation state. Here, the soft actuator includes a heat reaction member, a cooling part and a controller. The heat reaction member is configured to be contracted or relaxed according to a temperature change. The cooling part includes a cooling surface disposed at the heat reaction member, and a heating surface disposed opposite to the cooling surface. The controller is configured to control a power supply part so that a power is blocked to be supplied to the heat reaction member and the power is supplied to the cooling part, when the heat reaction member is changed to be a relaxation state.

In an example, in the method, the power supply part may be controlled so that the power is blocked to be supplied to the cooling part, when the heat reaction member reaches a maximum relaxation state.

In an example, in the method, the power supply part may be controlled so that the power is supplied to the heat reaction member, when the heat reaction member is changed to be a contraction state.

According to still another example embodiment, in a method for controlling a soft actuator, a cooling air is sprayed to make direct contact with a heat reaction member, for increasing a relaxation speed of the heat reaction member, when the heat reaction member is in a relaxation state. Here, a soft actuator includes a heat reaction member, a cooling part and a controller. The heat reaction member is configured to be contracted or relaxed according to a temperature change. The cooling part is configured to cool down the heat reaction member forcibly. The controller is configured to control a power supply part so that a power is blocked to be supplied to the heat reaction member and the power is supplied to the cooling part, when the heat reaction member is changed to be a relaxation state. The cooling part sprays a cooling air to make direct contact with the heat reaction member, for increasing a relaxation speed of the heat reaction member, when the heat reaction member is in a relaxation state.

In an example, the cooling air may be sprayed to be parallel with or perpendicular to a direction along which the heat reaction member is arranged.

According to the present example embodiments, a fabric type soft actuator having a cooler, in which a shape memory alloy spring is used and the cooler controls a temperature of the shape memory alloy spring, a wearable robot having the soft actuator, and a massage device having the soft actuator are provided.

Here, the shape memory alloy spring has a relatively large power density of a shape memory alloy wire, and also generates a relatively larger displacement (for example, about several hundred %), so that the soft actuator may be manufactured as a small, light and noiseless wearable fabric type soft actuator.

DETAILED DESCRIPTION

Figure 1:
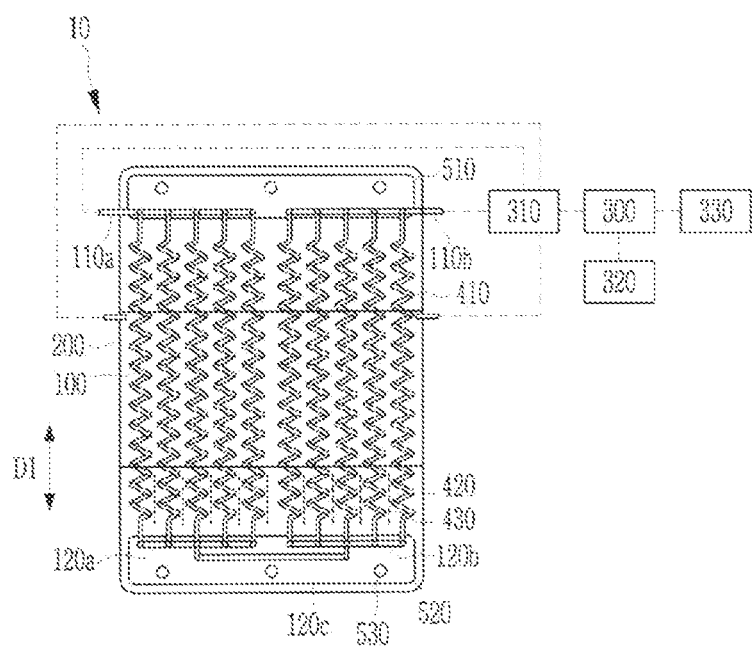
FIG. 1 is a structural view illustrating a soft actuator according to an example embodiment of the present invention.

The invention is described more fully hereinafter with Reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures.

It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The invention is described more fully hereinafter with Reference to the accompanying drawings, in which embodiments of the invention are shown.

Figure 2:
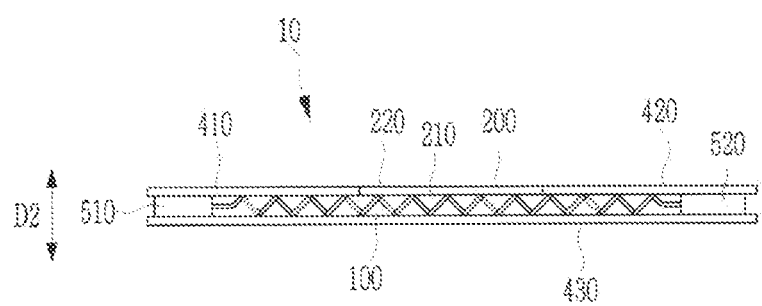
FIG. 2 is a side view illustrating an example of the soft actuator of FIG. 1.
Figure 3:
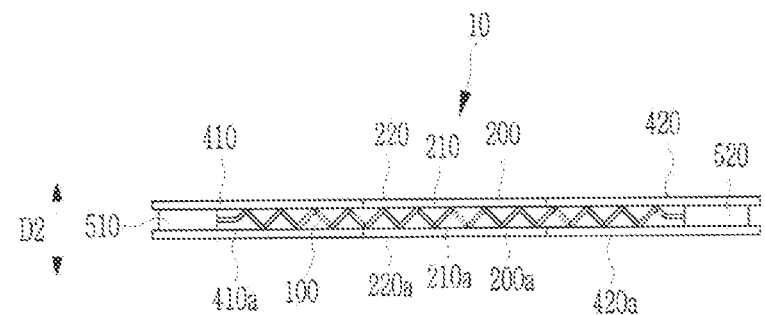
FIG. 3 is a side view illustrating another example of the soft actuator of FIG. 1.

FIG. 1 is a structural view illustrating a soft actuator according to an example embodiment of the present invention. FIG. 2 is a side view illustrating an example of the soft actuator of FIG. 1. FIG. 3 is a side view illustrating another example of the soft actuator of FIG. 1.

Referring to FIG. 1, the soft actuator 10 according to the present example embodiment includes a heat reaction member 100, a cooling part 200 and a controller 300.

Here, the soft actuator 10 may be manufactured to be a cloth type.

The heat reaction member 100 extends along a direction D1, and is contracted or relaxed according to a change of temperature. For example, when electricity is supplied, the heat reaction member 100 may be contracted along the direction D1, in reaction to a heat generated by the electricity. Alternatively, when the supply of the electricity is stopped, the heat reaction member 100 may be relaxed along the direction D1, since the temperature due to the heat is decreased.

The heat reaction member 100 may be a shape memory alloy material which is reacted to the heat. For example, the heat reaction member 100 may include a shape memory alloy wire or a shape memory alloy spring.

Alternatively, except for the shape memory alloy material, the heat reaction member 100 may include various kinds of heat reaction materials such as a shape memory resin, a shape memory polymer (SMP), a carbon nanotube, polyethylene, polyamide, nylon and so on.

The heat reaction member 100 is formed as a plurality of bundles, and here, a plurality of bundles of heat reaction members is disposed in parallel with each other.

In the plurality of the heat reaction members, a first portion 110a of a first side, a second portion 110b of the first side, a first portion 120a of a second side, and a second portion 120b of the second side are connected with each other. In addition, the first portion 120a of the second side and the second portion 120b of the second side are connected to each other. Thus, a current may flow in order of the first portion 110a of the first side, the first portion 120a of the second side, the second portion 120b of the second side, and the second portion 110b of the first side, or in order of an opposite to the order mentioned above.

The heat reaction member 100 is received by a body 410 and 420, and the body is formed to cover the heat reaction member 100 entirely.

A first fixing portion 510 and a second fixing portion 520 are respectively disposed at the first side of the body and the second side of the body. The first side of the heat reaction member is fixed to the first fixing portion 510 and the second side of the heat reaction member is fixed to the second fixing portion 520.

Each of the first and second fixing portions 510 and 520 includes a hole 530, and the soft actuator 10 may be connected to additional members using the hole 530.

The body 410 and 420 may include various kinds of materials, and may be contracted or relaxed according as the heat reaction member 100 is contracted or relaxed. For example, the body 410 and 420 may include a flexible material such as a fabric.

Referring to FIG. 1 again, a stitch 430 may be formed in the body, to insulate the plurality of the heat reaction members with each other. Thus, the heat reaction members are prevented from being contacted.

When the electricity is supplied, a first surface of the cooling part 200 is cooled, and a second surface of the cooling part 200 is heated.

Here, the cooling part 200 includes a cooling surface and a heating surface, and the cooling surface is cooled and the heating surface is heated when a power is supplied to the cooling part 200.

For example, the cooling part 200 may include a thermoelectric element or Peltier element, or may include a flexible thermoelectric element.

Referring to FIG. 2 and FIG. 3, the cooling surface 210 of the cooling part 200 is disposed at a side of the heat reaction member, and the heating surface 220 of the cooling part 200 is disposed at an opposite side of the cooling surface 210. In addition, the cooling surface 210 may be disposed to make contact with at least a portion of the heat reaction member. Thus, when the power is supplied to the cooling part 200, the heat reaction member may be cooled by the cooling surface 210.

The cooling part 200 may perform Peltier effect. Due to the Peltier effect, a heat flow flows together with the current flowing in a metal, the heat seems to be generated or absorbed in a contact surface since the flow is different at each of metals making contact with each other. In the Peltier effect, the generation or the absorption of the heat is reversible, so that the heat is generated at one side and the heat is absorbed at other side due to the flow of the current and the heat is absorbed at one side and the heat is generated at other side when the flow is reversed.

The cooling part 200 may include a flexible material, so that the cooling part 200 may be easily connected to the fabric.

Referring to FIG. 2 and FIG. 3 again, the cooling part 200 and the body 410 and 420 are connected with each other. Thus, at least a portion of the body may be replaced by the cooling part 200.

In FIG. 2, a portion of the surface of the body is replaced by the cooling part 200. Here, a first end and a second end of the cooling part 200 are respectively connected to a first body 410 and a second body 420. Here, the cooling part 200 may not be formed at an opposite surface 430 of the body.

Alternatively, in FIG. 3, a portion of the surface of the body is replace by a first cooling part 220, and a portion of the opposite surface of the body is replaced by a second cooling part 220a. Here, first and second ends of the first cooling part 220 are respectively connected to the first and second bodies 410 and 420, and first and second ends of the second cooling part 220a are respectively connected to third and fourth bodies 410a and 420a. Thus, the first and second cooling parts 220 and 220a face each other, with disposing the heat reaction member between the first and second cooling parts 220 and 220a.

The soft actuator 10 according to the present example embodiment may further include a power supply part 310, a sensing part 320 and a power source 390.

The controller 300 controls the power supply to the heat reaction member 100, so that the heat reaction member 100 may be changed from a contraction state to a relaxation state or from the relaxation state to the contraction state. Hereinafter, the power means the electricity.

For example, the controller 300 controls the power supply part 310, to supply the power to the heat reaction member 100. When the controller 300 transmits a power supply signal to the power supply part 310, the power supply part 310 supplies a current to the heat reaction member 100. In addition, when the controller 300 transmits a power stop signal to the power supply part 310, the power supply part 310 stops supplying the current to the heat reaction member 100.

Accordingly, as the current is supplied to the heat reaction member 100, the heat is generated so that the heat reaction member 100 is contracted. As the current is stopped, the temperature is decreased so that the heat reaction member 100 is relaxed. Here, a relaxation velocity is relatively slower, and thus in the present example embodiment, the cooling part 200 is used to increase responsiveness of a relaxation operation.

The power supply part 310 is configured to be connected to the heat reaction member and thus the current is supplied to the heat reaction member, and further detailed explanation for the configuration is omitted.

The sensing part 320 includes a sensor configured to measure a bio-information or an operation of a wearer. Here, the bio-information may include electromyography. For example, the sensing part 320 may include an electromyography sensor, and thus the sensor may measure a movement or an operation (for example, a contraction operation or a relaxation operation) of a muscle of the wearer according to a gripping, a moving and a supporting of a load. Alternatively, the sensing part 320 may include a voice sensor, and thus the senor may obtain information of behavior, state and needs of the wearer according to voice information of the wearer.

In addition, the sensing part 430 may include a sensor configured to measure a strain of the heat reaction member 100. For example, the sensing part 430 may include a strain gage.

The power source 330 supplies the electricity to at least one of the controller 300, the power supply part 310 and the sensing part 320.

The controller 300 controls the operation of the power supply part 310, based on the information measured by the sensing part 320.

For example, when the operation, like an arm bending motion, requiring the contraction of the heat reaction member is performed, the sensing part 320 provides the measured electromyography information to the controller 300. Then, the controller 300 decides the intention of the wearer, based on the received electromyography information. In addition, the controller 300 calculates a force for bending the arm, and then obtains the final force outputted by the soft actuator 300. Then, the controller 300 controls the power supply part 310 to generate the current supplied to the heat reaction member, so that the heat reaction member performs the operation.

The controller controls the power supply part 310 such that the power supplied to the heat reaction member is stopped and the power is supplied to the cooling part, when the heat reaction member is changed to be the relaxation state. Accordingly, the power supplied to the heat reaction member is stopped and the temperature starts to be decreased, and then the heat reaction member starts to be relaxed. In addition, the power is supplied to the cooling part, and the cooling surface close to the heat reaction member is operated, and as decrease of the temperature of the heat reaction member is accelerated, the relaxation speed of the heat reaction member is increased.

Figure 4A:
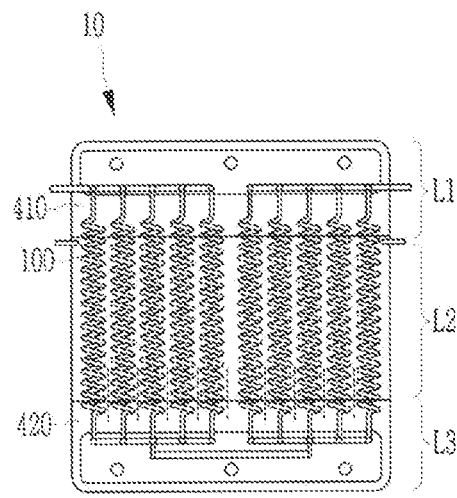
FIG. 4A is a plan view illustrating an example contraction operation of the soft actuator of FIG. 1.
Figure 4B:
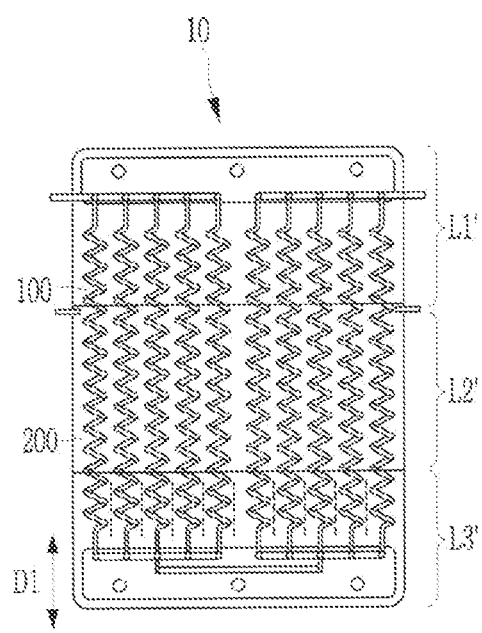
FIG. 4B is a plan view illustrating an example relaxation operation of the soft actuator of FIG. 1.
Figure 5A:
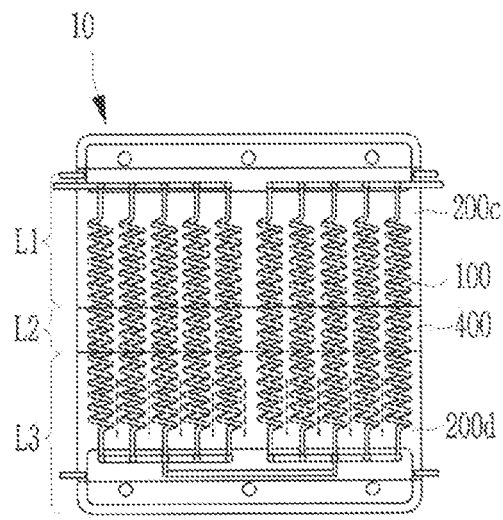
FIG. 5A is a plan view illustrating another example contraction operation of the soft actuator of FIG. 1.

FIG. 4A is a plan view illustrating an example contraction operation of the soft actuator of FIG. 1, and FIG. 4B is a plan view illustrating an example relaxation operation of the soft actuator of FIG. 1. FIG. 5A is a plan view illustrating another example contraction operation of the soft actuator of FIG. 1, and FIG. 5B is a plan view illustrating another example relaxation operation of the soft actuator of FIG. 1.

Referring to FIG. 4A and FIG. 4B, in the present example embodiment, the cooling part is connected to the body, so as for the cooling part to be disposed at an inside of the heat reaction member along a longitudinal direction of the heat reaction member. For example, the cooling part is disposed between the first body and the second body.

FIG. 4A shows the contracted state, and FIG. 4B shows the relaxed state. When the current flows to the heat reaction member and the heat reaction member is contracted, the body (fabric) may be contracted according to the contraction of the heat reaction member. Thus, a length of the first body is decreased from L1' to L1, and a length of the second body is decreased from L3' to L3.

Figure 5B:
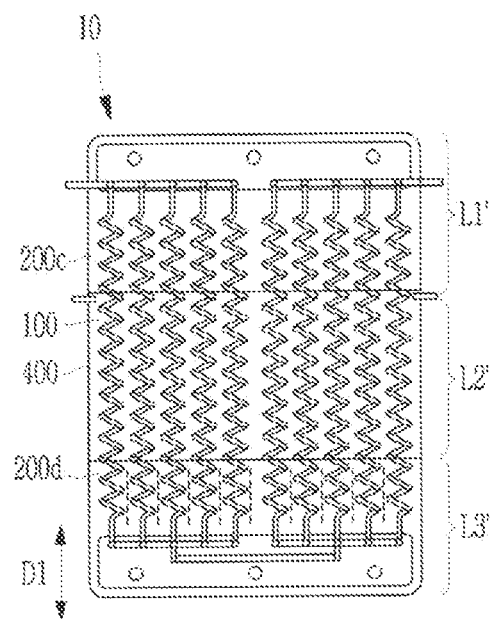
FIG. 5B is a plan view illustrating another example relaxation operation of the soft actuator of FIG. 1.

Alternatively, referring to FIG. 5A and FIG. 5B, in the present example embodiment, the cooling part is connected to the body, so as for the cooling part to be disposed at an outside of the heat reaction member along a longitudinal direction of the heat reaction member. For example, the body 400 may be disposed between the first and second cooling parts 200c and 200d.

FIG. 5A shows the contracted state, and FIG. 5B shows the relaxed state. When the current flows to the heat reaction member and the heat reaction member is contracted, the body (fabric) may be contracted according to the contraction of the heat reaction member. Thus, a length of the body is decreased from L2' to L2.

In FIG. 4A, FIG. 4B, FIG. 5A and FIG. 5B, the cooling part is shown as not to be contracted or relaxed, but the cooling part may be contracted and relaxed together with the body as the cooling part includes the flexible material.

Figure 6:
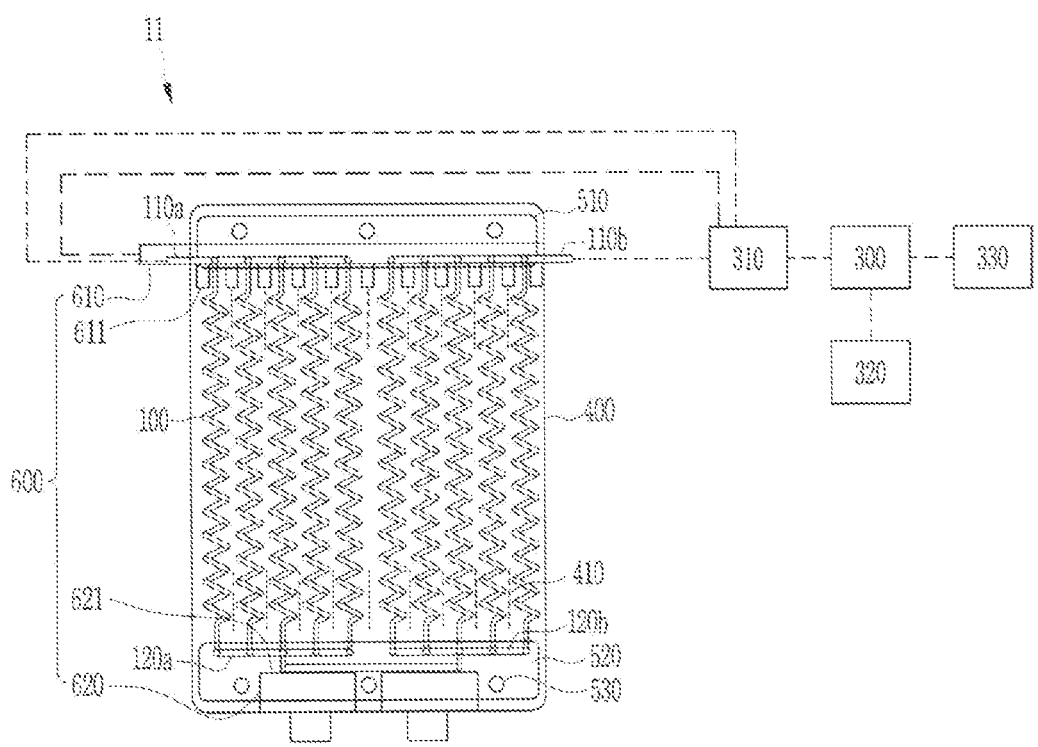
FIG. 6 is a structural view illustrating a soft actuator according to another example embodiment of the present invention.
Figure 7A:
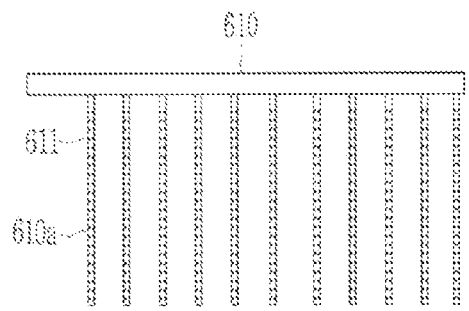
FIG. 7A and FIG. 7B are structural views illustrating another examples of the soft actuator of FIG. 6.
Figure 7B:
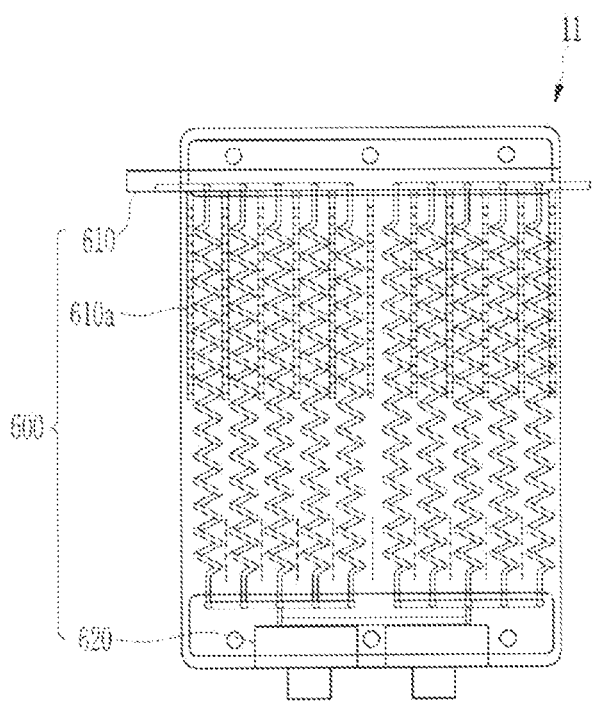

FIG. 6 is a structural view illustrating a soft actuator according to another example embodiment of the present invention. FIG. 7A and FIG. 7B are structural views illustrating another examples of the soft actuator of FIG. 6.

The soft actuator 11 according to the present example embodiment is substantially same as the soft actuator 10 according to the previous example embodiment in FIG. 1, FIG. 2 and FIG. 3, except for a cooling part 600, and thus same reference numerals are used for the same elements and any repetitive explanation will be omitted.

Referring to FIG. 6, in the soft actuator 11 according to the present example embodiment, the cooling part 600 is configured to cool the heat reaction member down forcibly.

In the present example embodiment, the cooling part 600 sprays a cooling air to make direct contact with the heat reaction member 100, to increase the relaxation speed of the heat reaction member 100, when the heat reaction member 100 is in the relaxation state. Thus, the problem in the conventional soft actuator, in which the relaxation speed is relatively slower due to a natural cooling, may be solved.

To spray the cooling air inside of the body 400, the cooling part 600 includes an inlet flow 610 configured to flow the cooling air inside of the body 400, and a discharge flow 620 configured to flow the cooling air outside of the body 400. Each of the inlet flow 610 and the discharge flow 620 may include a flexible material.

The cooling air may flow due to an operation of a fan or a blower and so on.

Each of the inlet flow 610 and the discharge flow 620 includes an inlet portion 611 and a discharge portion 621 which are formed as an opening.

As illustrated in FIG. 6, the inlet flow 610 is formed at a first end of the body which is an upper side of the cloth, and the discharge flow 620 is formed at a second end of the body which is a lower side of the cloth, so that the opening at the inlet portion 611 and the opening at the discharge portion 621 are opposite to each other and face each other. Thus, the cooling air may flow smoothly.

For example, the inlet portion 611 of the inlet flow 610 is formed along the direction substantially the same as the direction of the heat reaction member arranged inside of the body. Thus, the cooling air flows between the plurality of heat reaction members, and then the cooling efficiency may be increased.

FIG. 7A shows an example of the inlet flow 610 of the cooling air, and FIG. 7B shows the soft actuator having the inlet flow 610 of FIG. 7A.

As illustrated in FIG. 7A, the inlet flow 610 of the cooling air includes a micro inlet flow 610a extending from the inlet flow 610 toward the heat reaction member longitudinally, along an up-down direction in the figure.

As the heat reaction member is arranged in a plural, the micro inlet flow 610a is arranged in a plural too, and as illustrated in FIG. 7B, each of the micro inlet flows 610a is disposed between the heat reaction members adjacent to each other. Thus, the cooling effect for each heat reaction member is increased, and the heat reaction members adjacent to each other are prevented from being electrically connected. A length of the micro inlet flow 610a is shorter than that of the heat reaction member in the relaxation state as illustrated in FIG. 8B.

As illustrated in FIG. 7A, for each micro inlet flow 610a, a plurality of inlet portions 611 is formed in a flow, and the opening of each of the inlet portions 611 is formed substantially perpendicular to the direction along which the heat reaction member is arranged. Thus, the heat reaction member may be cooled down more rapidly.

FIGS. 8A, 8B, 8C and 8D are plan views illustrating contraction and relaxation operations of the soft actuator of FIG. 6. FIG. 9A, FIG. 9B, FIG. 9C and FIG. 9D are plan views illustrating contraction and relaxation operations of the soft actuators of FIG. 7A and FIG. 7B.

Figure 8A:
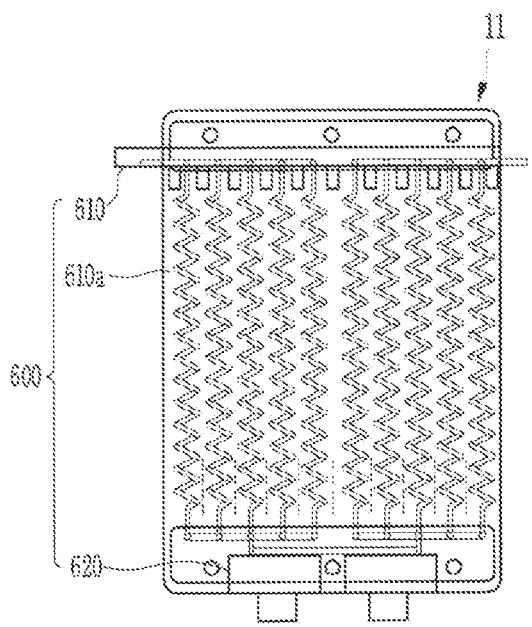
FIG. 8A, FIG. 8B, FIG. 8C and FIG. 8D are plan views illustrating contraction and relaxation operations of the soft actuator of FIG. 6.
Figure 8B:
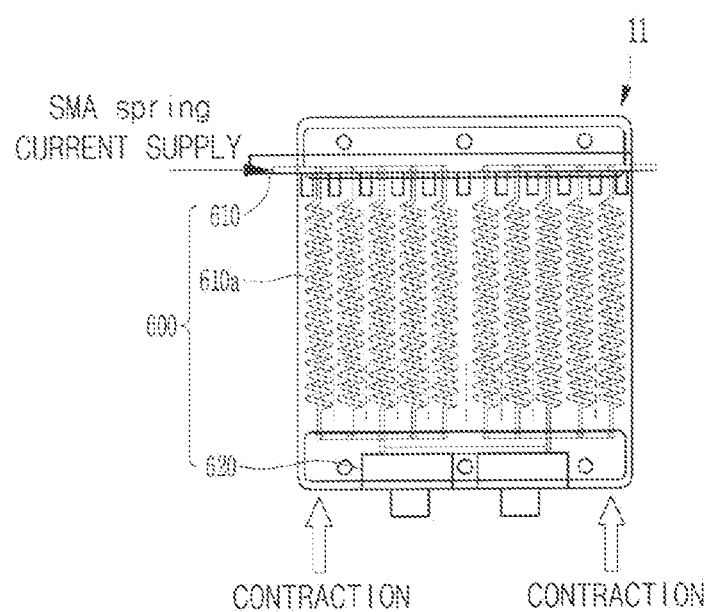
Figure 9A:
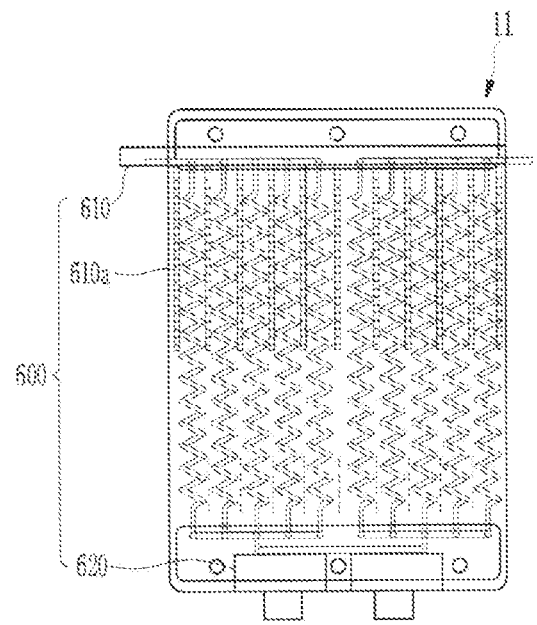
FIG. 9A, FIG. 9B, FIG. 9C and FIG. 9D are plan views illustrating contraction and relaxation operations of the soft actuators of FIG. 7A and FIG. 7B.

FIG. 8A and FIG. 9A show an initial relaxed state of the soft actuator 11, and the power is OFF and the inlet of the cooling air is also OFF in the soft actuator 11.

Figure 9B:
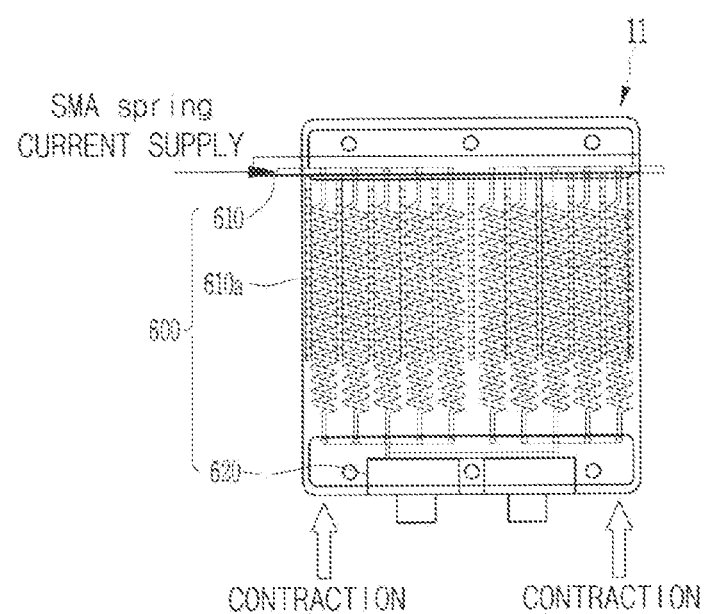

Then, FIG. 8B and FIG. 9B show a change from the relaxation state to the contraction state of the soft actuator 11, and the power is ON and the inlet of the cooling air is OFF in the soft actuator 11. Here, as the heat reaction member is contracted due to the flow of the current, the body having the fabric material is also contracted.

Figure 8C:
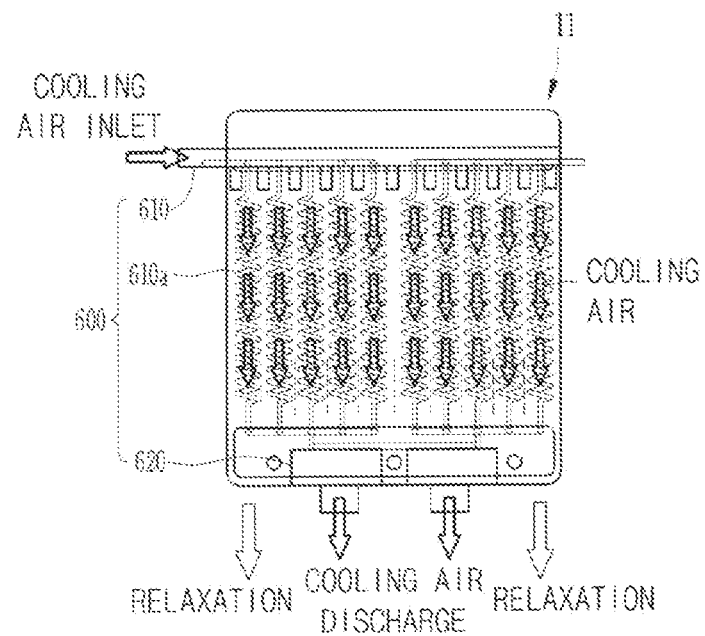
Figure 9C:
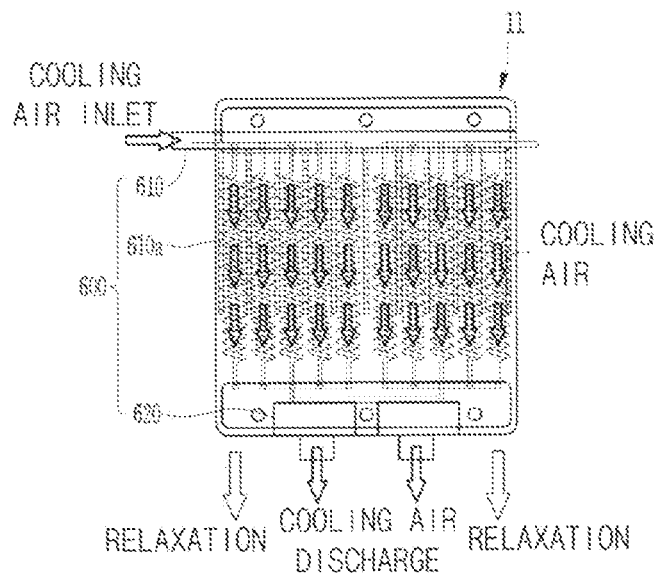

Then, FIG. 8C and FIG. 9C show a change from the contraction state to the relaxation state of the soft actuator 11, and the power is OFF and the inlet of the cooling air is On in the soft actuator 11.

Figure 8D:
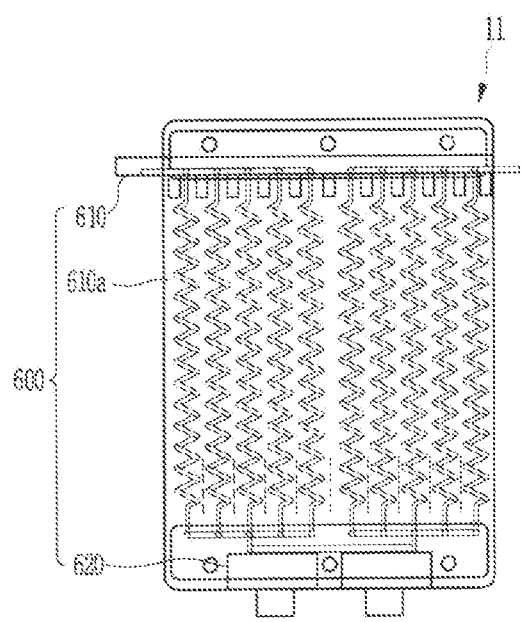
Figure 9D:
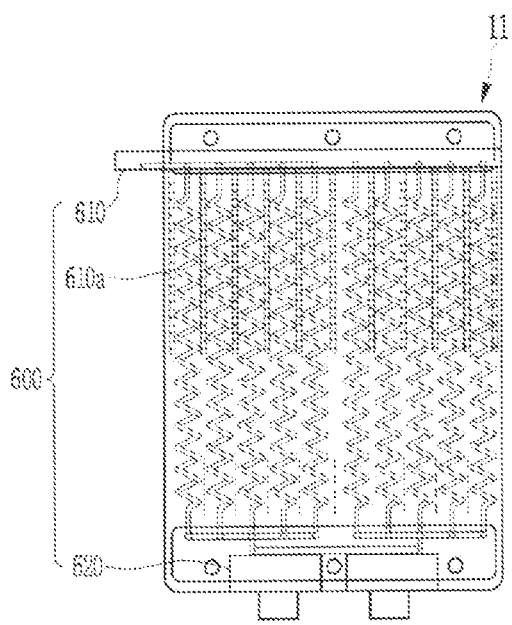

Finally, FIG. 8D and FIG. 9D show a returned relaxed state of the soft actuator 11 rapidly, due to the cooling air of the cooling part 600. Here, the cooling speed of the heat reaction member 100 is increased due to the cooling air.

Hereinafter, referring to FIG. 10, FIG. 11A and FIG. 11B, a wearable robot having the soft actuator of FIG. 1 is explained in detail.

Figure 10:
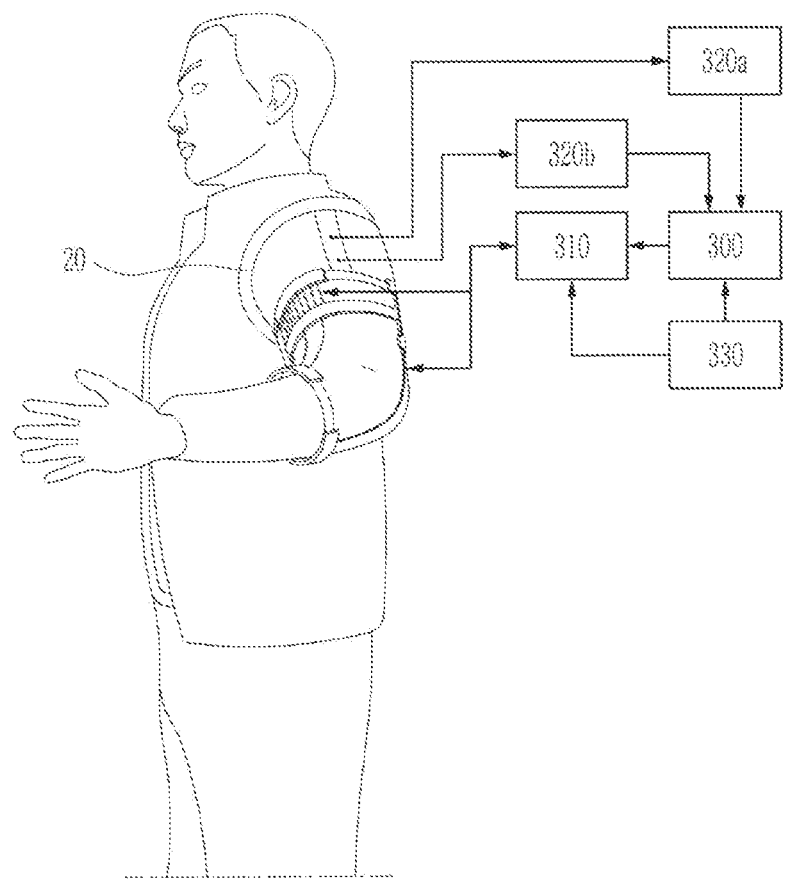
FIG. 10 is a structural view illustrating a wearable robot having the soft actuator of FIG. 1.

FIG. 10 is a structural view illustrating a wearable robot having the soft actuator of FIG. 1. FIG. 11A and FIG. 11B are example operating views illustrating an operation of the wearable robot of FIG. 10.

Figure 11A:
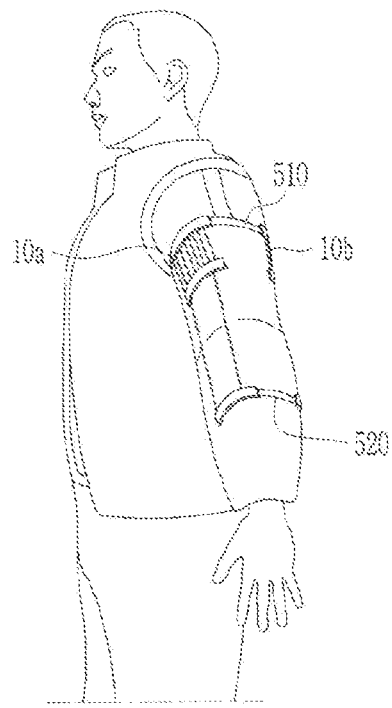
FIG. 11A and FIG. 11B are example operating views illustrating an operation of the wearable robot of FIG. 10.
Figure 11B:
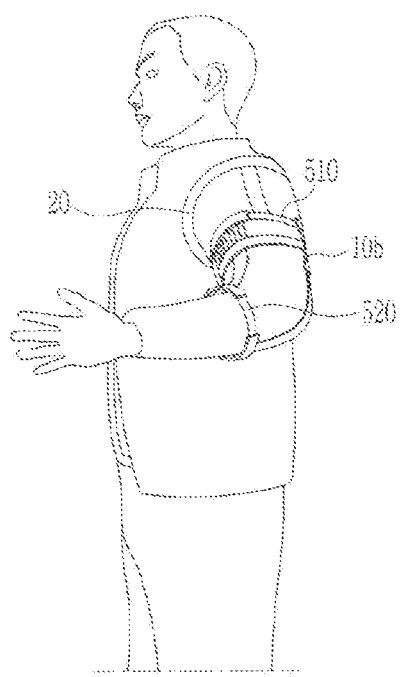

Referring to FIG. 10, FIG. 11A and FIG. 11B, the wearable robot includes a cloth body 20 and the soft actuator connected to the cloth body 20.

Here, the soft actuator may be the soft actuator 10 explained referring to FIG. 1 and may be the soft actuator 11 explained referring to FIG. 6. Thus, any repetitive explanation for the soft actuators 10 and 11 will be omitted.

The soft actuator 10 and 11, as explained above, may be manufactured as a cloth type, and the soft actuator 10 and 11 may be easily connected to the cloth body 20.

The cloth body 20 forms a base of a strength-enhancing clothing, and in the present example embodiment, the cloth body 20 forms a top clothing, but not limited thereto.

The cloth body 20 includes an inner skin and an outer skin, and the soft actuator 10 and 11 are disposed between the inner and outer skins. The actuator 10 and 11 is disposed close to a joint of the wearer in the cloth body 20.

The cloth body 20 includes a first body fixing part 510 and a second body fixing part 520. The first body fixing part 510 is disposed opposite to the second body fixing part 520 with respect to the position corresponding to the joint in the cloth body 20. For example, when the joint is an elbow, the first body fixing part 510 is disposed at a brachium, and the second body fixing part 520 is disposed at a forearm.

Here, a first side of the soft actuator 10 and 11 may be fixed at the first body fixing part 510, and a second side of the soft actuator 10 and 11 may be fixed at the second body fixing part 520.

Each of the first and second body fixing parts 510 and 520 include a band, and the band covers an arm of the wearer to attach an artificial muscle to the arm of the wearer tightly, or to fix the first and second body fixing parts 510 and 520 to the body of the wearer tightly.

Referring to FIG. 10, the wearable robot includes a sensor 320a or 320b configured to measure a movement of the wearer. The controller 300 of the wearable robot controls the power supply part 310 to block the power supply to the heat reaction member and to supply the power to the cooling part, when the sensor measures the movement of the wearer.

Referring to FIG. 11A and FIG. 11B, the wearable robot includes first and second soft actuators 10a and 10b. Here, each of the first and second soft actuators 10a and 10b may be one of the soft actuators 10 and 11 explained above.

When the wearer wears the wearable robot, the first and second soft actuators 10a and 10b face each other, and the first and second soft actuators 10a and 10b are respectively disposed at inner and outer sides of an arm (or a leg).

Here, the controller of the wearable robot may contract the first soft actuator 10a and and/or may relax the second soft actuator 10b, when the predetermined movement of the wearer is measured, for example a bending movement of the arm or the leg. The controller controls the power supply part to supply the power to the heat reaction member of the first soft actuator 10a, and/or controls the power not to supply the power to the heat reaction member of the second soft actuator 10b and to supply the power to the cooling part of the second soft actuator 10b at the same time.

Hereinafter, referring to FIG. 12 to FIG. 14B, a massage device having the soft actuator mentioned above is explained in detail.

Figure 12:
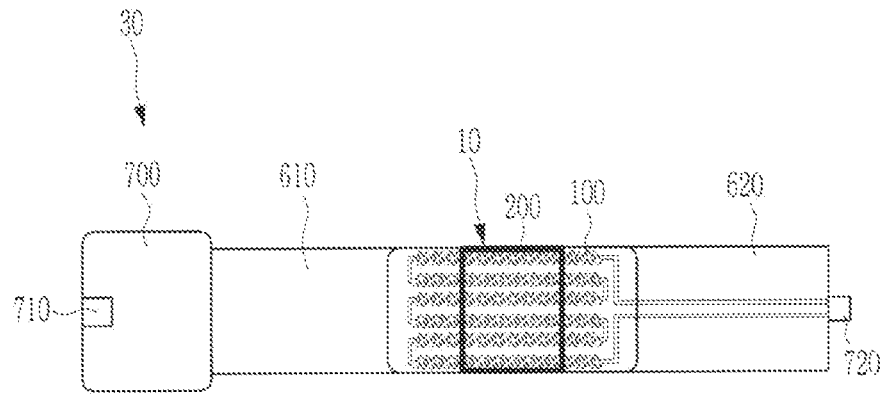
FIG. 12 is a structural view illustrating a massage device having the soft actuator of FIG. 1.

FIG. 12 is a structural view illustrating a massage device having the soft actuator of FIG. 1. FIG. 13A, FIG. 13B, FIG. 14A and FIG. 14B are example operating views illustrating an operation of the massage device of FIG. 12.

The massage device 30 includes at least one elastic band 610 and 620, and the soft actuator connected to the elastic band.

Here, the soft actuator may be the soft actuator 10 explained referring to FIG. 1 and may be the soft actuator 11 explained referring to FIG. 6. Thus, any repetitive explanation for the soft actuators 10 and 11 will be omitted.

Referring to FIG. 12, first and second elastic bands 610 and 620 are respectively connected to first and second sides of the body of the soft actuator. The controller and/or the power source 700 are connected to a first side of the first elastic band 610. In addition, a power connector 720 is formed at a first side of the second elastic band 620, and the power connector 720 is configured to be connected to a connector 710 formed at the power source 700. Thus, the power source 700 may provide the power to the heat reaction member 100.

Figure 13A:
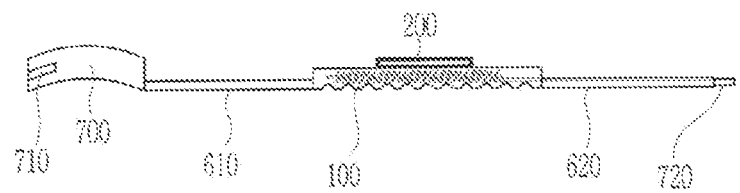
FIG. 13A, FIG. 13B, FIG. 14A and FIG. 14B are example operating views illustrating an operation of the massage device of FIG. 12.
Figure 13B:
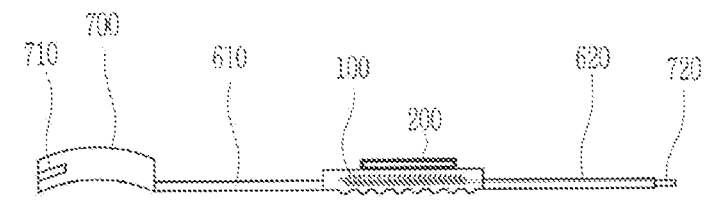
Figure 14A:
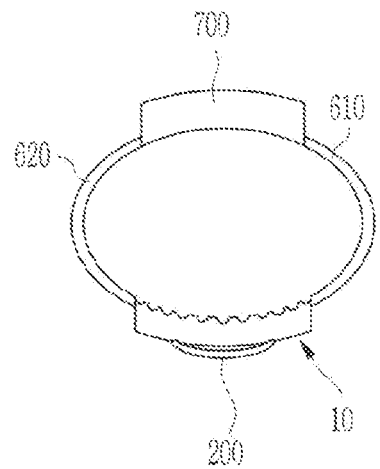
Figure 14B:
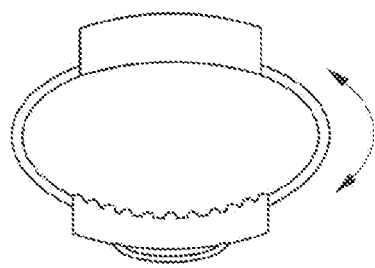

FIG. 13A and FIG. 13B respectively show the relaxation state and the contraction state of the massage device. In addition, FIG. 14A and FIG. 14B respectively show the relaxation state and the contraction state of the massage device with the connector connected. The massage device is contracted when used, and is relaxed when not used.

The controller controls the power supply part to block the power to be supplied to the heat reaction member for relaxing the massage device and to supply the power to the cooling part, when information on a user's un-usage input is received.

In addition, the controller controls the power supply part to supply the power to the heat reaction member for contracting the massage device and to block the power to be supplied to the cooling part, when information on a user's usage input is received.

FIG. 13A, FIG. 13B, FIG. 14A and FIG. 14B show the cooling part 200 combined with a surface of the body receiving the heat reaction member. Here, a cooling fluid is received in the body, and a protrusion is formed on a surface on which the cooling part 200 is not combined. When the massage device is contracted, a pressure inside of the body is increased to protrude the protrusion outwardly, and thus massage effect may be increased.

Although not shown in the figure, the massage device may be changed variously, and as mentioned above, the body of the massage device may be partially replaced by the cooling part.

Hereinafter, a method for controlling the soft actuators 10 and 11 is explained in detail.

The method includes a relaxation step (step S1110), a maximum relaxation step (step S1120), and a contraction step (step S1130).

In the relaxation step (step S1110), when the heat reaction member is changed to be the relaxation state, the power supplied to the heat reaction member is blocked and the power is supplied to the cooling part.

For example, when the power is blocked to be supplied to the heat reaction member, the temperature of the heat reaction member is decreased and is relaxed. In addition, since the power is supplied to the cooling part, the cooling surface close to the heat reaction member is operated. Thus, as the decrease of the temperature of the heat reaction member is accelerated, the relaxation speed of the heat reaction member is increased.

In the maximum relaxation step (step S1120), when the heat reaction member is in the maximum relaxation state, the power supply part is controlled such that the power supplied to the cooling part is blocked.

In the contraction step (step S1130), when the information related to the contraction of the heat reaction member is received, the controller controls the power supply part to supply the power to the heat reaction member. Thus, the temperature of the heat reaction member is increased, and the heat reaction member is changed to be the contraction state.

The device explained above may be implemented as a hardware component, a software component, and/or a combination of the hardware and software components. For example, the device and the components explained above may be implemented by at least one conventional computer or specialized computer, such as a processor, a controller, an arithmetic logic unit (ALU), a digital signal processor, a microcomputer, a field programmable gate array (FPGA), a programmable logic unit (PLU), a microprocessor, or any device performing an instruction and responding the instruction.

According to the example embodiments, a fabric type soft actuator having a cooler, in which a shape memory alloy spring is used and the cooler controls a temperature of the shape memory alloy spring, a wearable robot having the soft actuator, and a massage device having the soft actuator are provided.

Here, the shape memory alloy spring has a relatively large power density of a shape memory alloy wire, and also generates a relatively larger displacement (for example, about several hundred %), so that the soft actuator may be manufactured as a small, light and noiseless wearable fabric type soft actuator.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A soft actuator comprising:
a plurality of shape memory alloys configured to be contracted or relaxed according to a temperature change;
a cooling part configured to cool down the shape memory alloys of the plurality of shape memory alloys forcibly; and
a controller configured to control a power supply part so that a power is blocked to be supplied to the shape memory alloys of the plurality of shape memory alloys and the power is supplied to the cooling part, when the shape memory alloys of the plurality of shape memory alloys are changed to be in a relaxation state,
wherein the cooling part sprays cooling air to make direct contact with the shape memory alloys of the plurality of shape memory alloys, for increasing a relaxation speed of the shape memory alloys of the plurality of shape memory alloys, when the shape memory alloys of the plurality of shape memory alloys are in the relaxation state,
wherein the shape memory alloys of the plurality of shape memory alloys extend in a first direction, and
wherein the cooling part comprises an inlet flow having a plurality of inlet portions, the inlet flow being extended in a second direction perpendicular to the first direction and configured to flow the cooling air to the plurality of inlet portions.

2. The soft actuator of claim 1, further comprising:
a body configured to receive at least a portion of the shape memory alloys of the plurality of shape memory alloys inside of the body.

3. The soft actuator of claim 2, wherein the cooling part comprises:
a discharge flow configured to flow the cooling air outside of the body, and
wherein the inlet flow is configured to flow the cooling air inside of the body.

4. The soft actuator of claim 3, wherein ends of the shape memory alloys of the plurality of shape memory alloys are in a row along a side of the inlet flow corresponding to the second direction, and
wherein the inlet portions of the plurality of inlet portions of the inlet flow for the cooling air are formed as openings heading for the first direction.

5. The soft actuator of claim 3, wherein the inlet flow for the cooling air is formed at a first side of the body, and the discharge flow for the cooling air is formed at a second side of the body, and
wherein the first side is opposing to the second side.

6. The soft actuator of claim 3, wherein the inlet flow for the cooling air has a plurality of micro inlet flows that extend from the inlet flow along the first direction, and
wherein the inlet portions of the plurality of inlet portions are disposed on the micro inlet flows of the plurality of micro inlet flows.

7. The soft actuator of claim 6, wherein the micro inlet flows of the plurality of micro inlet flows have a length shorter than that of the shape memory alloys of the plurality of shape memory alloys in the relaxation state.

8. The soft actuator of claim 6, wherein the micro inlet flows of the plurality of micro inlet flows are between the shape memory alloys of the plurality of shape memory alloys to prevent the shape memory alloys of the plurality of shape memory alloys adjacent to each other from making contact with each other.

9. The soft actuator of claim 8, wherein the micro inlet flows of the plurality of micro inlet flows have side inlet portions, and at least one side inlet portion is an opening heading for the second direction.

10. A method for controlling a soft actuator, in which the soft actuator comprises:
a plurality of shape memory alloys configured to be contracted or relaxed according to a temperature change;
a cooling part configured to cool down the shape memory alloys of the plurality of shape memory alloys forcibly; and
a controller configured to control a power supply part so that a power is blocked to be supplied to the shape memory alloys of the plurality of shape memory alloys and the power is supplied to the cooling part, when the shape memory alloys of the plurality of shape memory alloys are changed to be in a relaxation state,
the method comprising:
spraying cooling air to make direct contact with the shape memory alloys of the plurality of shape memory alloys, for increasing a relaxation speed of the shape memory alloys of the plurality of shape memory alloys, when the shape memory alloys of the plurality of shape memory alloys are in the relaxation state,
wherein the shape memory alloys of the plurality of shape memory alloys extend in a first direction, and
wherein the cooling part comprises an inlet flow, having a plurality of inlet portions, the inlet flow being extended in a second direction perpendicular to the first direction and configured to flow the cooling air to the plurality of inlet portions.

11. The method of claim 10, wherein the cooling air is sprayed to be parallel with or perpendicular to the first direction.

* * * * *